United States Patent
Ihara et al.

Patent Number: 5,161,061
Date of Patent: Nov. 3, 1992

[54] COMPOUND ASPHERICAL LENS

[75] Inventors: Yuji Ihara, Kawasaki; Hiroshi Tanioka, Kashiwa, both of Japan

[73] Assignee: Nikon Corporation, Tokyo, Japan

[21] Appl. No.: 742,068

[22] Filed: Aug. 7, 1991

Related U.S. Application Data

[63] Continuation of Ser. No. 492,531, Mar. 7, 1990, abandoned.

[30] Foreign Application Priority Data

Mar. 13, 1989 [JP] Japan ................... 1-29040

[51] Int. Cl.⁵ .................... G02B 11/00; G02B 7/02
[52] U.S. Cl. .................... 359/708; 359/811; 359/819; 359/827
[58] Field of Search ........ 350/432, 528, 245, 252-253; 359/708, 710, 811, 819, 820, 827, 741, 793

[56] References Cited

U.S. PATENT DOCUMENTS

| | | | |
|---|---|---|---|
| 2,351,736 | 6/1944 | Benford | 350/528 |
| 4,577,935 | 3/1986 | Yamakawa et al. | 350/412 |
| 4,662,717 | 5/1987 | Yamada et al. | 350/245 |

*Primary Examiner*—Bruce Y. Arnold
*Assistant Examiner*—James Phan
*Attorney, Agent, or Firm*—Shapiro and Shapiro

[57] ABSTRACT

A compound aspherical lens comprising: a hard lens; a soft lens laminated to the hard lens in a direction of the optical axis; and a lens supporting surface formed around the effective diameter of the hard lens and exposed in the direction of the optical axis when the soft lens is laminated to the hard lens.

8 Claims, 4 Drawing Sheets

COMPOUND ASPHERICAL LENS

This is a continuation of application Ser. No. 492,531 filed Mar. 7, 1990, now abandoned.

BACKGROUND OF THE INVENTION

1. Field of the Invention

The present invention relates to a compound aspherical lens constituted by laminating a plastic lens to a glass lens.

2. Related Background Art

FIG. 6 shows an example of a conventional compound aspherical lens and the supporting structure therefor.

A compound aspherical lens 10 is constituted by laminating a plastic lens 12 to an aspherical lens 11 with an adhesive or the like. An ordinary spherical lens forming a photographing lens optical system must be arranged in such a manner that a plurality of lenses are positioned on the same optical axis for the purpose of reducing aberration. However, the number of the lenses can be reduced in a photographing lens optical system with the aberration reduction effect maintained by arranging the structure to employ an aspherical lens.

The thus constituted compound aspherical lens 10 is held by a lens frame 1 as shown in FIG. 6. That is, a flange-shape supporting portion 1a is formed on the inner surface of the cylindrical lens frame 1 so that a shoulder 11a is abutted against the supporting portion 1a. Furthermore, a threaded portion is formed in a portion of the inner surface of the lens frame 1 so that a retaining ring 2 is screwed on the threaded portion. As a result, an end portion of the retaining ring 2 is positioned in contact with an abutment portion 12a formed in the outer periphery of the plastic lens 12 so that the end portion of the retaining ring 2 presses the abutment portion 12a. That is, the compound aspherical lens 10 is secured and supported in such a manner that the outer periphery thereof is held between the retaining ring 2 and the supporting portion 1a.

However, with the thus-constituted conventional compound aspherical lens a problem arises in that the plastic lens 12 made of a soft material can be damaged or deformed because the end surface of the retaining ring 2 directly presses the outer periphery (the abutment portion 12a) of the plastic lens 12 due to the conventional structure arranged in such a manner that the glass lens 11 and the plastic lens 12 have the same diameter. If the plastic lens 12 is deformed, the width of an air layer (the distance from another lens) is disordered or the portion in which the glass lens 11 and the plastic lens 12 are joined to each other separates, causing desired optical performance to be lost. Another problem arises in that the working efficiency at the time of the assembling process deteriorates because the fixing of the retaining ring 2 must be conducted carefully for the purpose of preventing the deformation of the plastic lens 12. Furthermore, the profile irregularity (including an inclination with respect to the optical axis) of the abutment portion 12a is influenced by the profile irregularity of the surface 11b at which the glass lens 11 and the plastic lens 12 are joined to each other. Since error factors therefore increase with respect to a single lens, a satisfactory accuracy cannot be obtained. Therefore, a problem in terms of optical performance sometimes arises in that the compound aspherical lens 10 falls down with respect to the lens frame 1 when the abutment portion 12a is held by the retaining ring 2.

SUMMARY OF THE INVENTION

An object of the present invention is to enable a compound aspherical lens to be held in such a manner that the necessity of holding or pressing the plastic lens is eliminated.

The invention will be described with reference to FIGS. 1A and 1B which show an embodiment of the present invention.

The present invention is applied to a compound aspherical lens constituted by a glass lens 21 and a plastic lens 22. With such a compound aspherical lens, the above-described object can be achieved by arranging the structure so that a lens supporting glass-exposed portion 23, is formed around the effective diameter $r_1$ of the glass lens 21.

Thus, the plastic lens 22 can be protected from damage by arranging the structure in such a manner that the compound aspherical lens is supported by positioning the supporting portion in contact with the glass-exposed portion 23.

The profile irregularity of the glass-exposed portion 23 can, of course, be improved with respect to the profile irregularity of the abutment portion 12a according to the conventional example shown in FIG. 6 since the error causing factors can be decreased. Therefore, the falling of the compound aspherical lens 20 with respect to the lens frame 1 can be absolutely prevented by directly holding the glass-exposed portion 23 by the retaining ring 2.

It is to be expressly understood, however, that the drawing is for purpose of illustration only and is not intended as a definition of the limits of the invention.

DESCRIPTION OF THE PREFERRED EMBODIMENTS

First Embodiment

Referring to FIG. 1, a first embodiment of the present invention will be described.

Figure 1A:
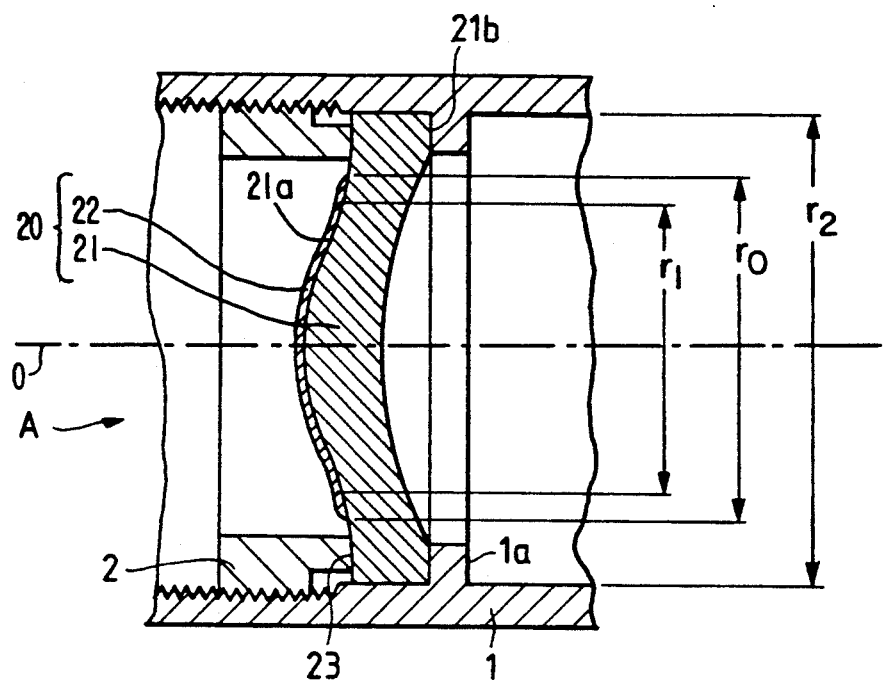
FIG. 1A is a cross sectional view which illustrates a supporting structure of a first embodiment of a compound aspherical lens according to the present invention.
Figure 1B:
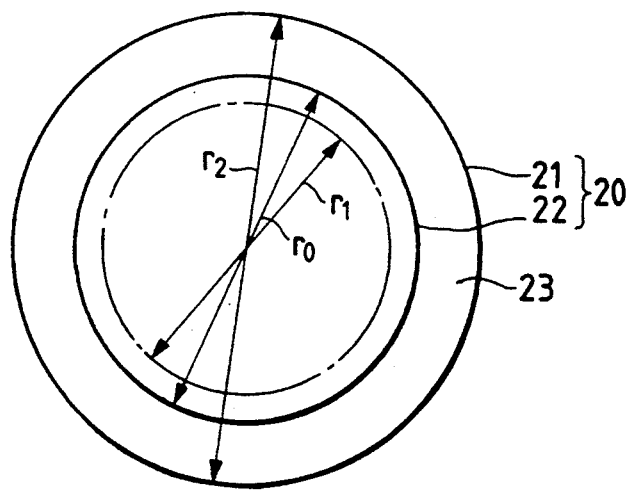
FIG. 1B illustrates the compound aspherical lens when viewed in direction A of FIG. 1A.
Figure 6:
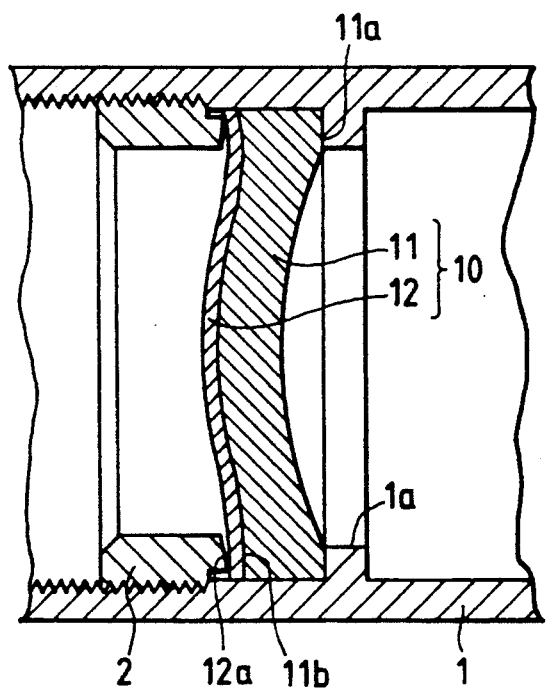
FIG. 6 is a cross sectional view which illustrates a conventional compound aspherical lens and the supporting structure therefor.

FIG. 1A is a cross-sectional view which illustrates a state in which a compound aspherical lens 20 according to the present invention is held in a lens frame 1. FIG. 1B illustrates the compound aspherical lens 20 when viewed in direction A. The elements which are the same as those shown in FIG. 6 are given the same reference numerals.

The compound aspherical lens 20 is constituted by laminating, with an adhesive or the like, a plastic lens 22 to a glass lens 21 having an aspherical surface 21a. As shown in FIG. 1B, the diameter $r_0$ of the plastic lens 22 is arranged to be larger than the effective diameter $r_1$ of the glass lens 21 and simultaneously is smaller than the outer diameter $r_2$ of the same. Thus, a glass-exposed portion 23 is formed around the effective diameter $r_1$ of the glass lens 21 in a direction of the optical axis O. The outer periphery on the reverse side of the glass lens 21 to the aspherical surface 21a is arranged to be a shoulder 21b.

The compound aspherical lens 20 is supported in the lens frame 1 by inserting the compound aspherical lens 20 into the lens frame 1 in such a manner that the shoulder 21b comes into contact with a supporting portion 1a in the lens frame 1. Then, a retaining ring 2 is screwed to the lens frame 1, and the end surface of the retaining ring 2 is then abutted against the glass-exposed portion 23. Thus, the compound aspherical lens 20 is supported in such a manner that the outer periphery of the glass lens 21 is held. Therefore, the plastic lens can be protected from damage or deformation. Furthermore, separation of the portion for joining the glass lens 21 and the plastic lens 22 can be prevented.

Figure 2:
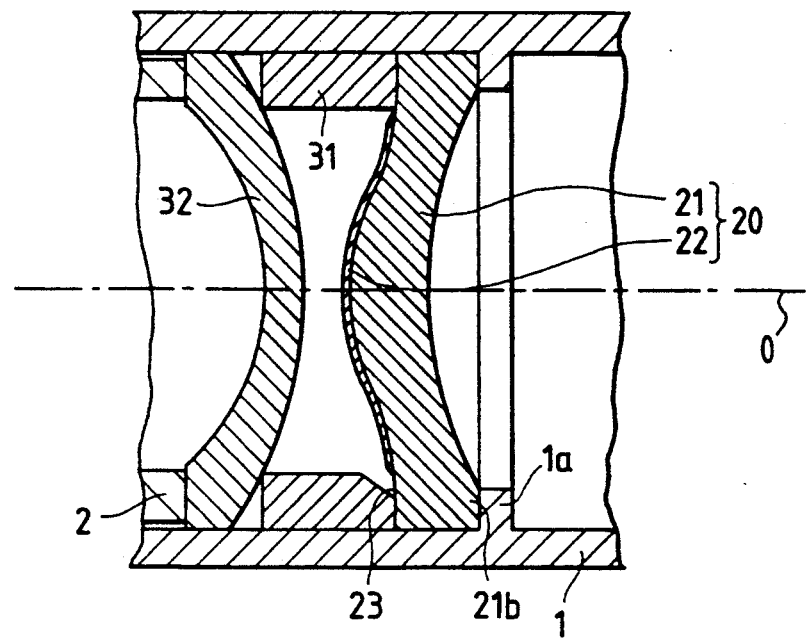
FIGS. 2 and 3 are cross sectional views which illustrate modifications of the present invention.
Figure 3:
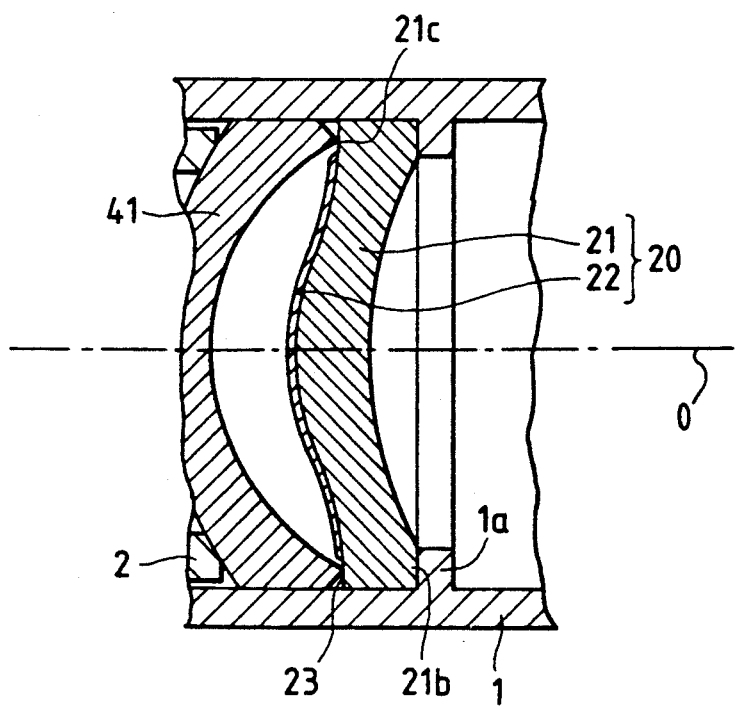

FIGS. 2 and 3 illustrate modifications of the present invention.

Referring to FIG. 2, a separation ring 31 is inserted into the lens frame 1. The compound aspherical lens 20 is, similarly to the first embodiment, supported in such a manner that its shoulder 21b is positioned in contact with the supporting portion 1a and the glass-exposed portion 23 is abutted against an end surface of the separation ring 31. A lens 32 is further inserted into the lens frame 1, the lens 32 being supported in such a manner that its outer periphery is held between another end portion of the separation ring 31 and the end portion of the retaining ring 2. In this case, also the compound aspherical lens 20 is supported in a state where the outer periphery of the glass lens 21 is held. Therefore, the plastic lens 22 is protected from deformation and the interval (the width of an air layer) between the lenses 20 and 32 can be maintained as desired.

Referring to FIG. 3, a lens 41 is, together with the compound aspherical lens 20, inserted into the lens frame 1. The compound aspherical lens 20 is, similarly to the above-made description, supported in such a manner that its shoulder 21b is positioned in contact with the supporting member 1a and an abutment portion 21c is positioned in contact with the outer periphery of the surface of the lens 41. The outer periphery of the other surface of the lens 41 is pressed by the above-described retaining ring 2.

According to the above-described structure, a similar effect can be obtained.

Second Embodiment

Figure 4A:
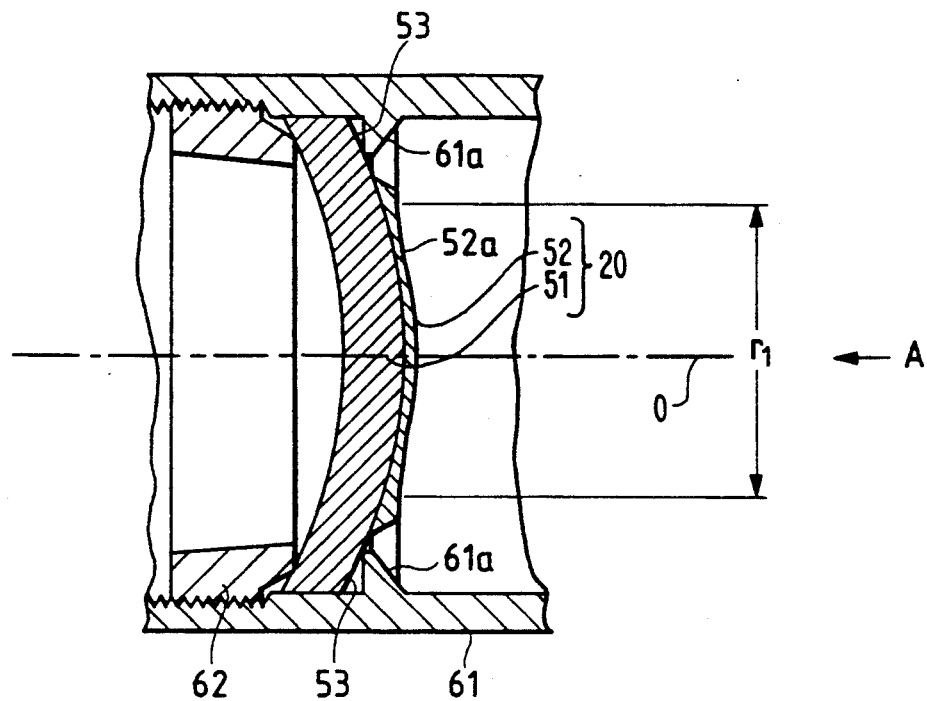
FIG. 4A is a cross sectional view which illustrates a supporting structure of a second embodiment of a compound aspherical lens according to the present invention.
Figure 4B:
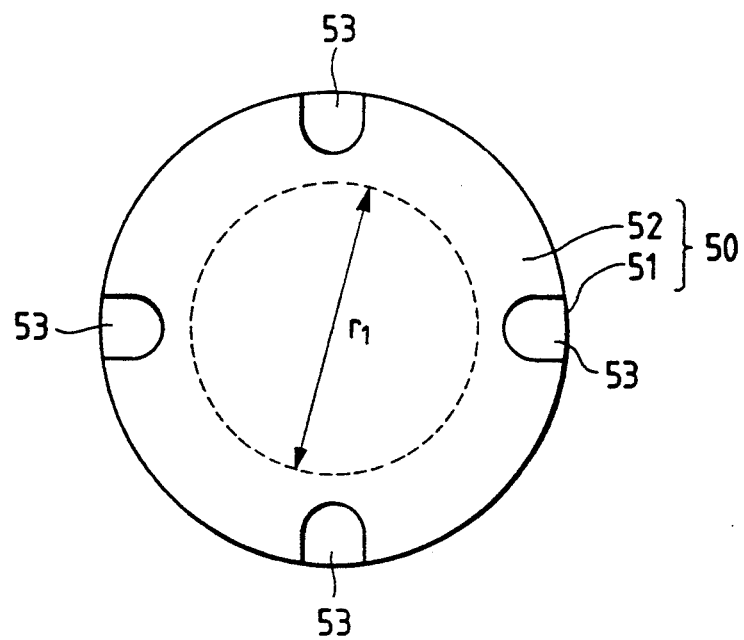
FIG. 4B illustrates the compound aspherical lens of FIG. 4A when viewed in direction A.

Now, a second embodiment according to the present invention will be described with reference to FIGS. 4A and 4B.

A compound aspherical lens 50 according to this embodiment is constituted by laminating a plastic lens 52 having an aspherical surface to either side of a glass lens 51 having two spherical surfaces. The plastic lens 52 is arranged to have the same diameter as that of the glass lens 51 and to have four cuts at predetermined angular intervals as shown in FIG. 4B in the portion which comes into contact with the portion around the effective diameter $r_1$ of the glass lens 51. The thus-formed cuts are arranged to be glass-exposed portions 53 in a direction of the optical axis O. On the other hand, four lens-supporting projections 61a are formed on the inner surface of a lens frame 61 at predetermined angular intervals.

The compound aspherical lens 50 is inserted and supported in the lens frame 61 in such a manner that the four glass-exposed portions 53 come into contact with the corresponding four projections 61a. Then, a retaining ring 62 is screwed into the lens frame 1 in such a manner that the end surface of the retaining ring 62 is abutted against the other outer periphery of the glass lens 51. Thus, the compound aspherical lens 50 is supported in such a manner that the outer periphery of the glass lens 51 is supported as described above.

Figure 5:
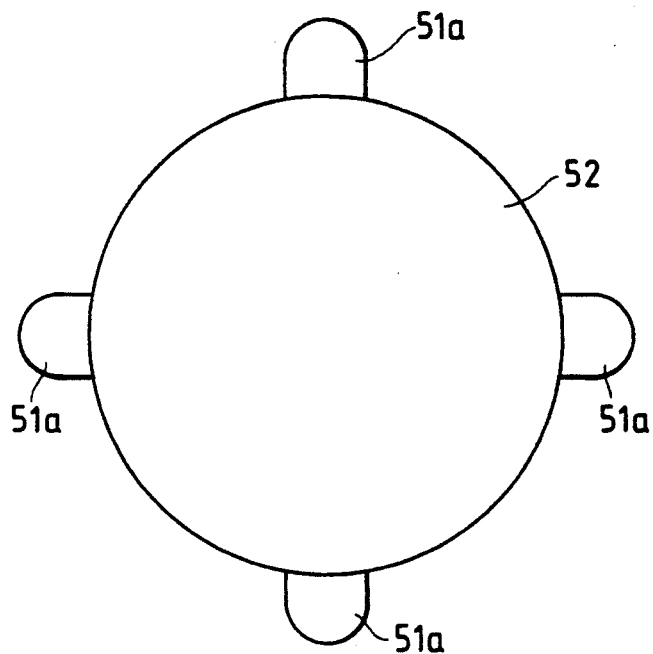
FIG. 5 illustrates a modification to the compound aspherical lens according to the present invention.

Another structure as shown in FIG. 5 may be employed in which the glass lens 51 and the plastic lens 52 having the same diameter are laminated to each other and four projections 51a are integrally formed on the outer periphery of the glass lens 51 so that the projections 51a are, as the glass-exposed portions in a direction of the optical axis O, abutted against the projections 61a when the laminated glass lens 51 and the plastic lens 52 are supported in the lens frame 61.

According to the present invention, since a lens-supporting glass-exposed portion of the glass lens is provided around the effective diameter of the glass lens, the compound aspherical lens can be supported in such a manner that the necessity of holding or pressing the plastic lens can be eliminated. Therefore, the plastic lens can be protected from damage or deformation. Therefore, the width of an air layer (the interval from an other lens) can be maintained properly and the separation of the portion for joining the glass lens and the plastic lens can be prevented.

The glass-exposed portion of the glass lens is arranged to be a shoulder for contacting the retaining ring, the separation ring or an other lens, as an alternative to a plastic lens surface which can easily cause error in terms of the profile irregularity (including the falling down with respect to the optical axis). Therefore, the falling of the compound aspherical lens or that of the other lens can be significantly prevented. And, excellent optical performance can be obtained.

Furthermore, since the necessity of considering the deformation of the plastic lens can be eliminated, assembling work can be easily performed and working efficiency can thereby be improved.

Although the invention has been described in its preferred form with a certain degree of particularly, it is understood that the preferred form can be changed in the details of construction and the combination and arrangement of parts may be modified to without departing from the spirit and the scope of the invention as hereinafter claimed.

What is claimed is:

1. A compound lens having an optical axis and comprising:
   a hard lens member; and
   a soft lens member superposed to one side of said hard lens member in a direction of the optical axis; said hard lens member having a periphery portion radially projecting outside an effective diameter of said hard lens member at said one side and being exposed in the direction of the optical axis when said soft lens member is superposed to said hard lens member, wherein each of said hard lens member and said soft lens member is in the form of a cylindrical shape having substantially the same outer diameter and said periphery portion is formed by cuts in a surface of said soft lens member.

2. A compound lens according to claim 1, wherein the number of said cuts is four.

3. A compound lens having an optical axis and comprising:
   a hard lens member; and
   a soft lens member superposed to one side of said hard lens member in a direction of the optical axis; said hard lens member having a periphery portion radially projecting outside an effective diameter of said hard lens member at said one side and being exposed in the direction of the optical axis when said soft lens member is superposed to said hard lens member, wherein each of said hard lens member and said soft lens member is in the form of a cylindrical shape having substantially the same outer diameter and said periphery portion is formed by radial projections of said hard lens member, said projections having a surface exposed in the direction of the optical axis.

4. A compound lens according to claim 3, wherein the number of said projections is four.

5. A lens assembly having a compound lens and an optical axis and comprising:
   a lens supporting member;
   a hard lens member; and
   a soft lens member superposed to one side of said hard lens member in a direction of the optical axis; said hard lens member having a periphery portion radially projecting outside an effective diameter of said hard lens member at said one side and being exposed in the direction of the optical axis when said soft lens member is superposed to said hard lens member, said hard lens member being supported by said lens supporting member through said periphery portion, wherein each of said hard lens member and said soft lens member is in the form of a cylindrical shape having substantially the same outer diameter and said periphery portion is formed by cuts in a surface of said soft lens member.

6. A lens assembly having a compound lens according to claim 5, wherein the number of said cuts is four.

7. A lens assembly having a compound lens and an optical axis and comprising:
   a lens supporting member;
   a hard lens member; and
   a soft lens member superposed to one side of said hard lens member in a direction of the optical axis; said hard lens member having a periphery portion radially projecting outside an effective diameter of said hard lens member at said one side and being exposed in the direction of the optical axis when said soft lens member is superposed to said hard lens member, said hard lens member being supported by said lens supporting member through said periphery portion, wherein each of said hard lens member and said soft lens member is in the form of a cylindrical shape having substantially the same outer diameter and said periphery portion is formed by radial projections of said hard lens member, said projections having a surface exposed in the direction of the optical axis.

8. A lens assembly having a compound lens according to claim 7, wherein the number of said projections is four.

* * * * *